Oct. 6, 1925.
A. ENGEL
1,555,948
MIXING FAUCET
Filed Aug. 13, 1924
2 Sheets-Sheet 1
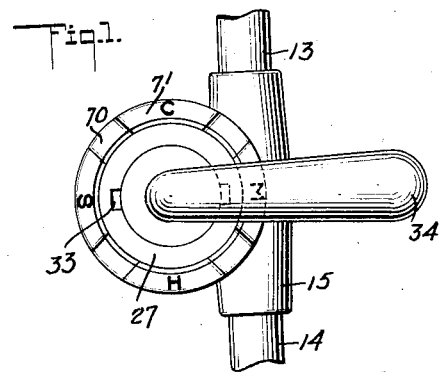
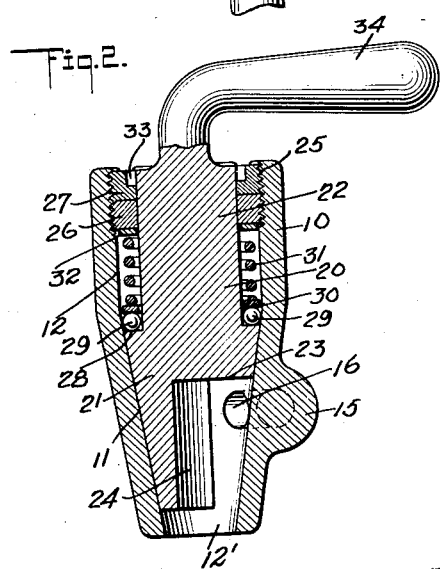
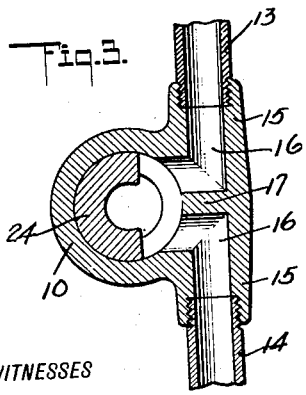
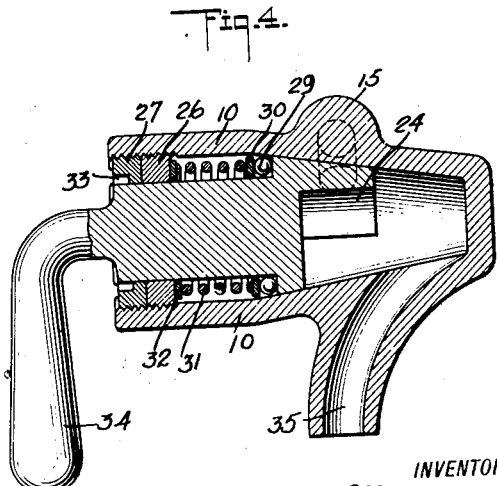
WITNESSES
Frederick Diehl.
P. H. Pattison.
INVENTOR
A. ENGEL
BY Munn & Co.
ATTORNEYS Oct. 6, 1925.
A. ENGEL
MIXING FAUCET
Filed Aug. 13, 1924
1,555,948
2 Sheets-Sheet 2
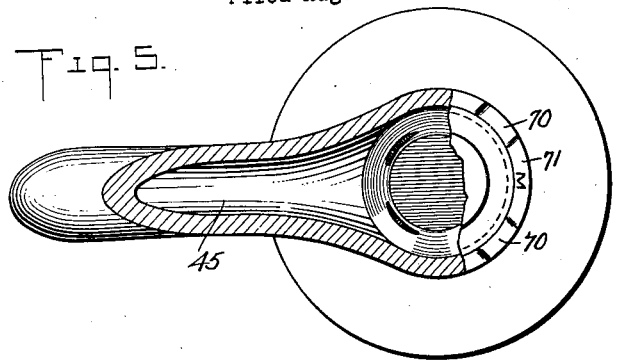
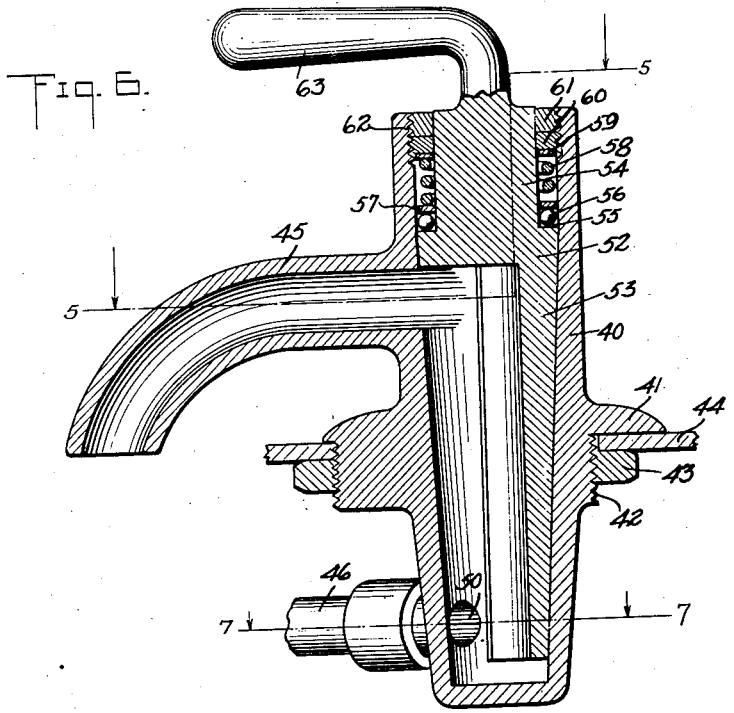
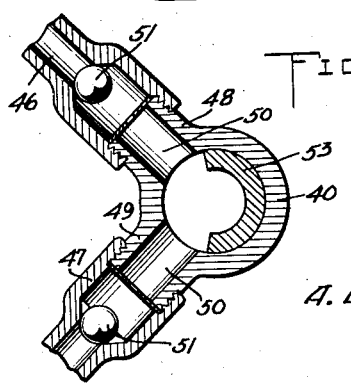
INVENTOR
A. ENGEL Patented Oct. 6, 1925.

1,555,948

UNITED STATES PATENT OFFICE.

ABRAHAM ENGEL, OF NEW YORK, N. Y.

MIXING FAUCET.

Application filed August 13, 1924. Serial No. 731,772.

*To all whom it may concern:*

Be it known that I, ABRAHAM ENGEL, a citizen of the United States, and a resident of the city of New York, borough of the Bronx, in the county of Bronx and State of New York, have invented a new and Improved Mixing Faucet, of which the following is a full, clear, and exact description.

The present invention relates to new and useful improvements in valves and it pertains more particularly to a mixing faucet.

It is one of the primary objects of the invention to provide a valve in which hot and cold water may be mixed to provide a common flow of water of the desired temperature.

It is a further object of the invention to so construct the valve that its external mechanism may be adapted to valves or valve casings of various types without material change.

It is a further object of the invention to provide a valve or faucet which is capable of use in various positions by merely employing the internal mechanism of the valve or faucet with valve casings of various designs.

It is a further object of the invention to provide a valve or faucet which is simple in construction and of low cost of manufacture.

With the above and other objects in view, reference is had to the accompanying drawings, in which—

Figure 1 is a top plan view of one form of the invention;

Fig. 2 is a vertical sectional view of the form shown in Fig. 1;

Fig. 3 is a horizontal sectional view of the form shown in Fig. 1;

Fig. 4 is a longitudinal sectional view of modified form of valve;

Fig. 5 is a horizontal sectional view of a still further modified form taken on the line 5—5 of Fig. 6;

Fig. 6 is a vertical sectional view of the modified form of valve shown in Fig. 5, and Fig. 7 is a horizontal sectional view taken on the line 7—7 of Fig. 6.

Referring to the drawings and more particularly to Fig. 2, the reference character 10 designates the valve casing, and said valve casing is formed with a tapered cylindrical portion 11 terminating in a lower open end 12′, and a straight portion 12. Leading into the tapered portion 11 of the valve casing are inlet pipes 13 and 14 for hot and cold water, respectively. These inlet pipes 13 and 14 are connected to internally screw-threaded nipples or the like 15, each of which is provided with a passage 16, preferably right-angular in form, in order that it may lead to the interior of the tapered portion 11 of the valve casing 10. While in the present instance the inlet pipes 13 and 14 are described as having screw-threaded engagement with interiorly-threaded nipples respectively, it is obvious that any desired connection may be used at this point, such as slip joints, outside couplings, or the like. These right-angular passages are separated one from the other by a partition 17, which serves to prevent uninterrupted communication between the two inlets 13 and 14.

The reference character 20 designates a turning plug, and said turning plug is formed with a tapered body portion 21 and a reduced cylindrical portion 22. This tapered body portion 21 is cut out to provide a shoulder 23, and a depending semi-circular portion 24 adapted to project downwardly of the tapered portion 11 of the casing 10 to a point where during the rotation of the plug, the extended portion 24 will cover and uncover the inner ends of the right-angular passages 16.

The upper end of the straight portion 12 of the casing 10, is provided with an internal screw-thread 25, and adapted for engagement with said screw-thread 25, are two nuts 26 and 27, the nut 27 serving as a lock nut for the nut 26.

Mounted upon the shoulder 28 formed at the base of the reduced portion 22 of the plug 21, is a plurality of balls or other suitable anti-friction elements 29, and resting upon said anti-friction elements 29, is a washer 30. Mounted upon the washer 30, is a coil spring 31, the upper end of which engages a washer 32, which in turn engages the under face of the nut 26. While in the present instance the anti-friction elements 29 have been described as engaging the shoulder 28, it is obvious that they may be interposed between the washer 32 and the nut 26, instead of the washer 30 and the shoulder 28, or, if desired, two series of anti-friction elements 29 may be employed, one set being interposed as shown, between the washer 30 and the shoulder 28 of the plug 21, and the other set being interposed between the washer 32 and the nut 26.

The nut 27 is provided with a plurality of recesses 33, by means of which the nut may be engaged with suitable means to remove the same from the interior of the casing 10.

The reference character 34 designates a handle for the plug 21, said handle forming the means by which the valve member is rotated within the casing 10, and through the medium of the spring 31 the tapered portion 21 of the plug member 20 will be maintained in liquid-tight engagement with the inner surface of the tapered portion 11 of the valve casing 10.

In Fig. 4 is duplicated the foregoing mechanism, except that in this form of the invention the casing 10 is provided with a discharge or outlet arranged in the side thereof and designated by the reference character 35. It is obvious that the construction of the valve as heretofore described is adaptable to a casing of this type without modification of the mechanism.

In the form of the invention shown in Figs. 5 to 7, inclusive, a valve is illustrated, which is particularly adapted for use in connection with sinks, stationary basins, and the like, and in this form of the invention, a casing 40 is tapered throughout the greater portion of its length and said casing is provided intermediate of its ends with a continuous flange 41 and a screw-threaded portion 42. The reference character 43 designates a nut adapted for engagement with the screw-threaded portion 42 to secure the valve in place on a stationary basin or the like 44. The casing 40 is provided with a discharge or outlet passage 45 of any desired shape or form, and said discharge or outlet passage communicates with the interior of the valve casing 40, as more clearly shown in Fig. 6. Leading to the interior of the casing 40 near the lower end thereof, are two supply pipes 46 and 47 for hot and cold water, respectively, and said pipes are connected to lugs 48 and 49, respectively, said lugs each being provided with a passage 50 in order that liquid flowing through the pipes 46 and 47 may enter the interior of the valve casing 40. The reference character 51 designates a suitable check valve mounted in each of the pipes 46 and 47 in order to prevent the liquid in one pipe from passing through the liquid in the other pipe in the event that the pressure in one pipe be in excess of the pressure in the other pipe.

Mounted within the casing 40 is a plug 52 and said plug 52 has a depending extension 53 projecting approximately to the bottom of the casing 40 and terminating at a point below the lower edge of the inlet passages 50. This plug 52 is provided with a reduced upper portion 54 which construction provides a shoulder 55. Resting upon the shoulder 55 is a plurality of anti-friction elements 56 upon which rests a washer 57. Engaging the upper face of the washer and resting thereon, is a coil spring 58, and resting on the upper end of the coil spring 58 is a washer 59. The reference characters 60 and 61 represent a nut and a lock nut, respectively, the nut 60 engaging the washer 59 to maintain the spring and anti-friction elements in position, said nuts engaging an internally screw-threaded portion 62 of the casing 40 to retain the plug in position therein. This plug 54 is provided with an operating handle 63, my means of which said plug is rotated within the casing 40.

In all forms of the invention the upper edge of the housing is notched as indicated by the reference character 70, and said notches provide means adapted to be engaged by one of the fingers of the hand of the operator in order that the operator may determine the position of the valve by sense of touch. The space 71 between these notches 70 may be provided with any suitable designating characters to indicate the position of adjustment of the valve and thus regulate the temperature of the fluid discharged therefrom.

The device operates in the following manner: In the form of the invention shown in Figs. 1 and 4, as the handle is grasped and the plug 20 is rotated, the depending extension 24 of said plug will be moved to a position where it will uncover both of the inlet passages 16 and discharge both hot and cold water to the interior of the valve casing, or said plug may be moved to the position where the extension 24 may partly close either of said inlet passages to permit of the inflow of a smaller amount of either cold or hot water depending upon the position of the plug.

In the form of the invention shown in Figs. 5 to 7, the plug 53 may be rotated within the casing 40 in order to open both of the passages 50, or partially open either of said passages, in order that the proportion of hot and cold water entering the casing to be discharged from the outlet passage 45, may be varied.

From the foregoing it is apparent that the present invention provides a new and novel form of valve, which owing to its construction will at all times be fluid-tight and may be adjusted as the wear of the turning plug necessitates. Furthermore, by reason of the employment of the nuts and jam nuts to secure the several parts together, the valve is readily disassembled for purposes of cleaning and repair, and, at the same time, the structure heretofore mentioned when employed in combination with a coil spring, serves to maintain the valve at all times in engagement with the tapered seat of the casing, and thereby insure a fluid-tight joint between said valve and its casing.

In addition to the above, the employment of the anti-friction elements permits of a free turning of the plug within the valve casing and serves to offset the resistance offered by the spring to the free and easy turning of the plug member within the valve casing.

I claim:

1. A device for controlling and regulating the flows of fluids from different sources comprising a casing having a plurality of inlets and an outlet, a plug movably mounted in said casing, and an extension on said plug for controlling said inlets simultaneously, said extension and a portion of the wall of said casing forming a passage between said inlets and said outlet.

2. A device for controlling and regulating the flows of fluids from different sources comprising a casing having a plurality of inlets and an outlet, a movable plug yieldably mounted in said casing, and an extension on said plug for controlling said inlets simultaneously, said extension and a portion of the wall of said casing forming a passage between said inlets and said outlet.

3. A device of the character described comprising a casing having a tapered portion, a plug mounted in said casing, a tapered extension projecting from said plug and adapted to control inlet passages in the valve casing, and means for maintaining a tapered portion of the plug in working engagement with the tapered portion of the valve casing.

4. A device of the character described comprising a valve casing provided with inlet passages and having a tapered portion, a plug mounted in said valve casing and having an extension projecting therefrom to a point below the inlet passages of the casing, whereby said extension is adapted to control the movement of fluid through said inlet passages to the interior of the valve casing, and means for maintaining said extension in engagement with the tapered portion of the casing.

5. A device of the character described comprising a casing having inlet passages and a tapered portion, a plug mounted in said casing, said plug having a body portion, a tapered extension upon one side thereof and a coil spring surrounding said reduced portion and adapted to maintain the valve in engagement with the tapered portion of the valve casing.

6. A device of the character described comprising a valve casing having inlet passages and a tapered portion, a valve body adapted for rotation within the valve casing, an extension projecting from one side of the valve body and adapted to control the movement of fluid through the inlet passages, a reduced portion projecting from the opposite side of said valve body, a coil spring surrounding said reduced portion, and means adapted for engagement with the casing and the coil spring to maintain the first-mentioned extension of the valve member in engagement with the tapered portion of the valve casing and in position to control the movement of fluid through the inlet passages.

ABRAHAM ENGEL.